(No Model.) 3 Sheets—Sheet 1.
J. T. LISTER.
APPARATUS FOR MANUFACTURING CARBONS.
No. 356,879. Patented Feb. 1, 1887.
Fig. 1.
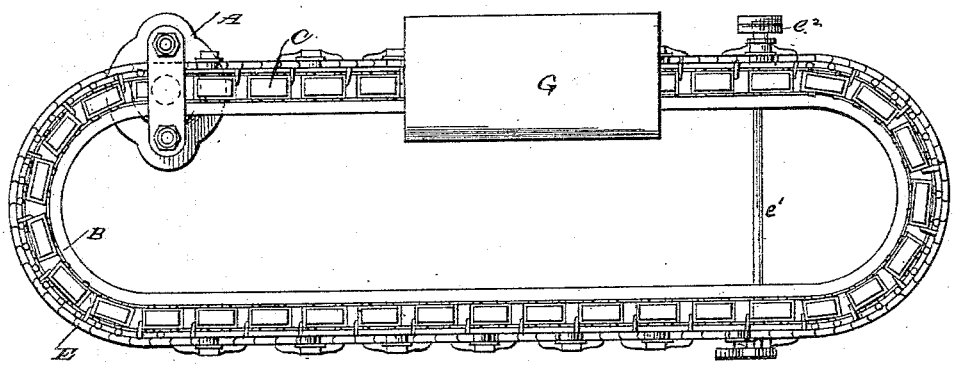
Fig. 4. Fig. 5. Fig. 3.
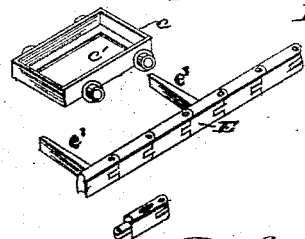 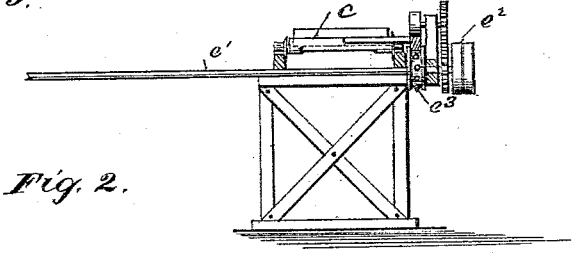
Fig. 2.
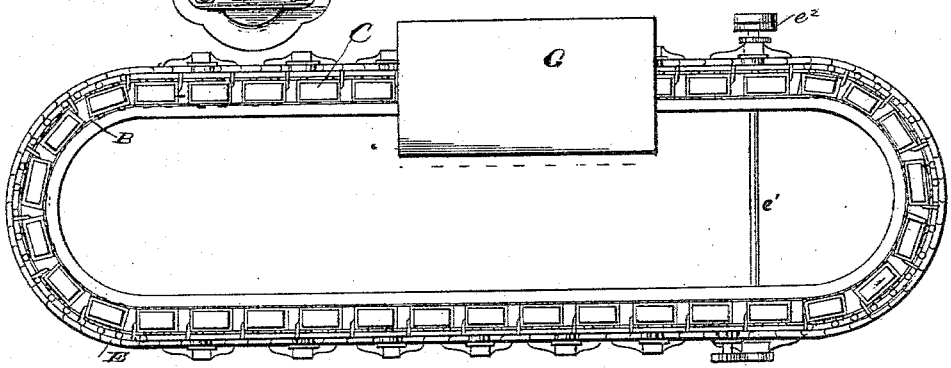
Fig. 13.
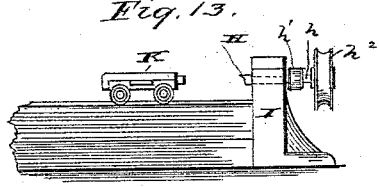
Witnesses
Wm. M. Monroe,
Chas. D. O'Connor
Inventor
John T. Lister
by H. T. Fisher
Attorney.
N. PETERS, Photo-Lithographer, Washington, D. C.

(No Model.) 3 Sheets—Sheet 2.

J. T. LISTER.
APPARATUS FOR MANUFACTURING CARBONS.

No. 356,879. Patented Feb. 1, 1887.

Witnesses
Wm. M. Monroe
Chas. D. O'Connor

Inventor
John T. Lister
by H. T. Fisher,
Attorney.

(No Model.) 3 Sheets—Sheet 3.

J. T. LISTER.
APPARATUS FOR MANUFACTURING CARBONS.

No. 356,879. Patented Feb. 1, 1887.

Witnesses.
Wm. M. Monroe,
Chas. D. O'Connor

Inventor
John T. Lister
by H. T. Fisher
Attorney.

UNITED STATES PATENT OFFICE.

JOHN T. LISTER, OF CLEVELAND, OHIO.

APPARATUS FOR MANUFACTURING CARBONS.

SPECIFICATION forming part of Letters Patent No. 356,879, dated February 1, 1887.

Application filed August 30, 1886. Serial No. 212,270. (No model.)

*To all whom it may concern:*

Be it known that I, JOHN T. LISTER, a citizen of the United States, residing at Cleveland, in the county of Cuyahoga and State of Ohio, have invented certain new and useful Improvements in Machines for Manufacturing Carbons; and I do hereby declare that the following is a full, clear, and exact description of the invention, which will enable others skilled in the art to which it appertains to make and use the same.

The invention relates to improvements in machines for manufacturing carbons, and the object is to provide a machine which will simplify and cheapen the method of handling the carbons, both before and after they reach the press, and to improve the process of pointing them.

The invention consists in the construction and combination of parts hereinafter described, and especially pointed out in the claims.

Figure 6:
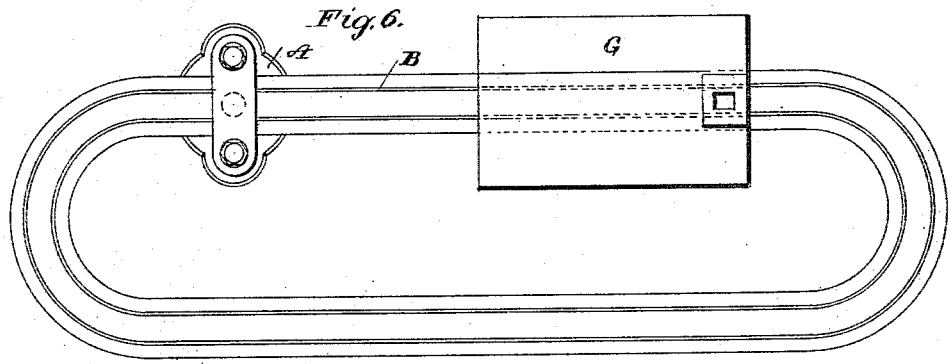
Figure 7:
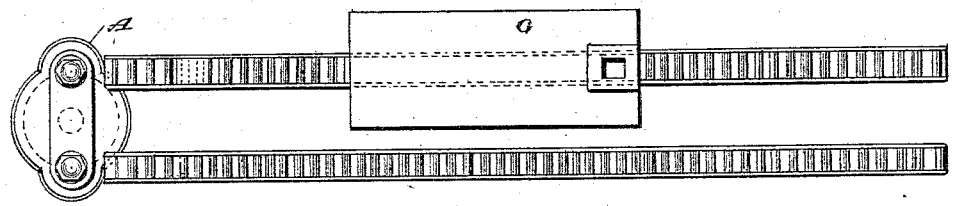
Figure 8:
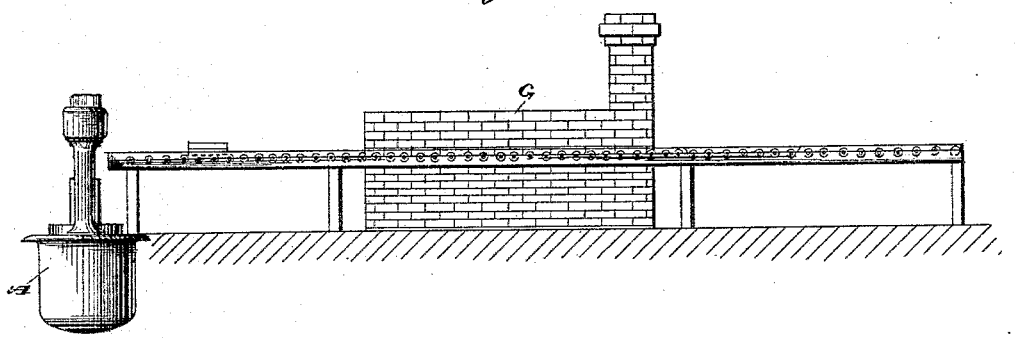
Figure 11:
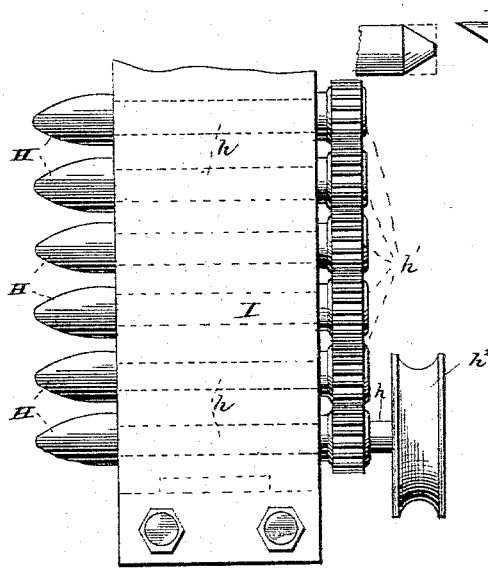
Figure 9:
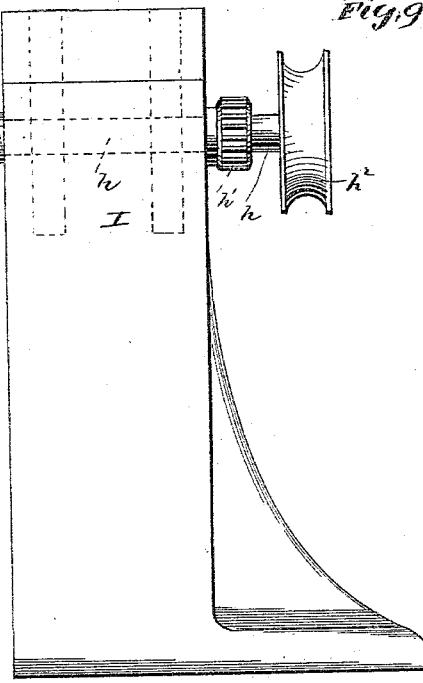
Figure 10:
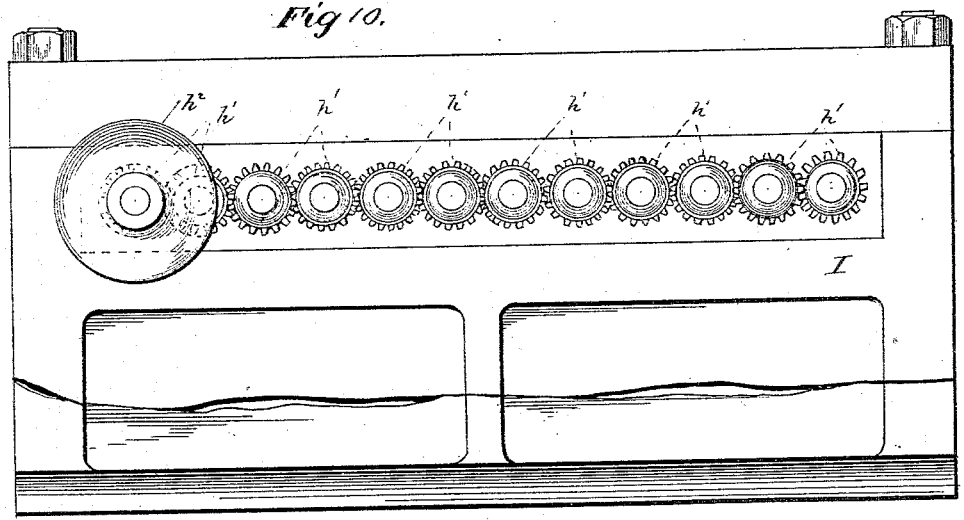
Figure 12:

In the accompanying drawings, Figure 1 represents a plan view of a press and an endless track running through the press and furnace, and a chain to draw or impel the cars around the track. Fig. 2 is a plan view of a press and an endless track and furnace similar to Fig. 1, except that the track does not pass through the press. Fig. 3 is a vertical section of the mechanism for actuating the endless chain. Fig. 4 is a perspective, partly broken away, of the car adapted to carry the mold. Fig. 5 is a section of the endless chain. Fig. 6 is a plan view of a press, track, and furnace, in which there is no mechanism shown for moving the molds along. Fig. 7 shows two straight tracks, with rollers for the mold or mold-carrier to travel on, a furnace, and a press at the end of the track. Fig. 8 is a side view of the structure shown in Fig. 7. Fig. 9 is an end elevation of the pointing mechanism. Fig. 10 is a rear elevation thereof. Fig. 11 is a plan view with a part broken away. Fig. 12 is a detail of one of the point-forming cutters. Fig. 13 is a side elevation of a car with carbon ends exposed approaching the cutting mechanism.

A represents the hydraulic press, which may be of any usual and approved pattern.

B is the track for carrying the mold directly to or from the press. This track is designed to save the labor of carrying the molds to and from the press by hand, and may be made in any of the styles shown.

In Figs. 1 and 4 the track is illustrated as endless and passing through the press. In Fig. 2 it is endless, but passes outside the press. In Figs. 7 and 8 the track is shown as formed in two sections, one for conveying the mold to the press, and the other to convey it away. In this case the mold would require lifting at both ends of the track to make the necessary transfers.

Obvious variations in the form of the track might be adopted other than those shown here without departing from the spirit of my invention, the object and limitation being to save and avoid manual labor, as above described.

In Figs. 1 and 2 I show a car or carriage, C, mounted on suitable wheels that travel on the track, and having a box, $c$, to hold the mold, and an opening, $c'$, to adapt it to the press. The mold D being placed in the car, it remains there except when in the press, in which case the mold is caught in the press during the process or act of pressing and lifted slightly above its seat in the car.

E is an endless chain run by sprocket-wheels $e$, shaft $e'$, and pulley $e^2$, as shown in Fig. 3. Arms $e^3$ on the chain extend inward therefrom at intervals, and serve to push or move the cars along. A double band wheel or pulley is shown, by means of which and any suitable shifting mechanism under control of the pressman the movements of the molds to the press may be regulated. The details of this mechanism are not regarded as material.

In some instances it may be desirable to impel the molds on the track by hand, as is provided for in the form shown in Fig. 6; and in Figs. 7 and 8, where rollers are shown, either hand-power or suitable mechanism—such as an endless chain—may be employed. Obviously an endless apron for conveying the molds might be substituted.

G represents the furnace, which may be of any desired style, provided it is arranged to accommodate the track and to heat the carbon-dust and mold together in their passage through the furnace. It may be fifteen or twenty feet in length, more or less, according to the rapidity with which the molds are carried along and the number to be in heating at the same time.

In Figs. 9 to 13, inclusive, I show improved mechanism for pointing the carbons. This consists of a series of cutters, H, shaped as shown, and attached to short shafts $h$, journaled in a stationary frame, I, which is designed to be placed transversely across the track on which the carbons are located when pointed. The cutters H are beveled on their inner faces, so as to correspond to the bevel to be given to the carbon-point, and, having sharp cutting-edges, they quickly remove the carbon to the desired depth. The shafts $h$ are connected by gears $h'$ on the rear of the frame, and are driven by band-wheel $h^2$ and belt. In operation the carbons are placed in car K, or other equivalent receptacle, and so arranged that only a slight portion of one end is exposed. The car then being impelled gradually toward the rapidly-revolving cutters, the points in the entire series of carbons are simultaneously and quickly formed. It is of course understood that this pointing occurs before the carbons have been baked.

Having thus described my invention, what I claim, and desire to secure by Letters Patent, is—

1. In a carbon-machine, a press and a continuous and unbroken track running to and from the press, in combination with a mold adapted to be conveyed over the track to the press without change of track, substantially as set forth.

2. In a carbon-machine, a press and a continuous and unbroken track, in combination with a furnace in the line of the track and a mold adapted to travel over the track and through the furnace to the press without change of track, substantially as set forth.

3. In a carbon-machine, a press, a track, a mold, and a chain arranged to impel the mold on the track, substantially as set forth.

4. In a carbon-machine, a track, a furnace arranged in the line of the track, an endless chain to impel the mold, and mechanism for driving the chain, substantially as set forth.

JOHN T. LISTER.

Witnesses:
H. T. FISHER,
WM. M. MONROE.